Patented May 4, 1926.

1,583,014

UNITED STATES PATENT OFFICE.

EUGEN SCHAAL, OF FEUERBACH, GERMANY.

PROCESS FOR THE PRODUCTION OF HARD RESINOUS BODIES.

No Drawing.    Application filed August 25, 1924. Serial No. 734,075.

*To all whom it may concern:*

Be it known that I, EUGEN SCHAAL, a citizen of Germany, residing at Feuerbach, Wurttemberg, Germany, have invented certain new and useful Improvements in Processes for the Production of Hard Resinous Bodies, of which the following is a specification.

The present invention relates to a process for the production of resinous bodies which form a complete substitute for copal and amber for use in the manufacture of varnishes and the like.

The resin ester produced according to the process described in German Patent No. 32,083, as well as the hardened resin produced in accordance with German Patent No. 128,034, have essentially lower melting points than the products produced according to the present invention. These hardened resin esters show melting points like for example fused copal, which is transparent at 125 to 130 degrees C. and fuses in the form of rings at or about 150 to 160 degrees C. when enclosed and heated in a tube. The hardened colophony which is transparent at 90 to 95 degrees C. fuses in a series of ring-shaped forms at or about 125 to 128 degrees C. This higher melting point is of considerable importance or significance in the manufacture of varnishes and the like. This process depends essentially on the treatment of the basic material which is easily procured in finely-divided condition as resin esters, colophony and the like, such treatment consisting in the subjection of the material, with the addition of some other materials, to the action of heat and a stream of air which act as oxidizing and dehydrating agents. The process can be carried out for example in the following manner:

An intimate mixture is made of 100 parts of finely-pulverized resin ester or rosin with 0.3 parts cobalt acetate, 40 parts anhydrous sodium sulphate (or with a mixture of 20 parts of anhydrous sodium sulphate and 20 parts of dry sodium chloride). Manganese resinate or manganese borate may be used instead of cobalt acetate.

The mixture is best introduced into a rotating drum at from 30 degrees C. and is subjected to a gradually-increasing heat whilst admitting a stream of air, this being effected in such manner that the mass does not melt or fuse together. Samples which are washed with water and dried permit of determining the advance in the degree of hardness of the material. When sufficient hardness is obtained the resinous mass is well washed with warm water and dried by slightly melting or fusing.

The hard resin ester produced by this process can be dissolved in linseed oil direct after the same manner as copal, and can be used for the production of good oil varnishes and the like. Colophony can also be hardened like a resin ester whereby solely in view of the lower melting point of the colophony in contradistinction to that of the resin ester the treatment of the reaction mass can be effected at a temperature which is about 10 degrees lower.

The product thus obtained is not only suitable for oil varnishes and the like, but it can also be used with spirit varnishes and the like. In the latter case an addition of 5 per cent, to 10 per cent glycerine or a mixture of linseed oil acid with glycerine may be conveniently used for increasing the elasticity of the product.

What I claim is:

1. A process for the production of hard oil soluble resinous bodies as copal substitutes, consisting in the steps of mixing a finely pulverized rosin with a mixture of sodium chloride, sodium sulphate and cobalt acetate, and then subjecting the final mixture to heat and a stream of air so that it does not melt or fuse together until the desired degree of hardness is obtained.

2. A process according to claim 1 characterized in that the mixture consists of 100 parts rosin, 0.3 parts cobalt acetate, 20 parts sodium sulphate and 20 parts sodium chloride.

3. A process for the production of hard oil soluble resinous bodies as copal substitutes consisting in the step of subjecting a mixture containing rosin and sodium sulphate to a heat and oxidizing treatment and preventing melting and fusion until the desired degree of hardness has been obtained.

4. A process for the production of hard oil soluble resinous bodies as copal substitutes consisting in the step of subjecting a mixture containing rosin, sodium sulphate and sodium chloride to a heat and oxidizing treatment and preventing melting and fusion until the desired degree of hardness has been obtained.

5. A process for the production of hard oil soluble resinous bodies as copal substitutes consisting in the step of subjecting a mixture containing rosin, sodium sulphate and cobalt acetate to a heat treatment and preventing melting and fusion until the desired degree of hardness has been obtained.

6. A process according to claim 4, characterized in that the mixture consists of 100 parts rosin, 20 parts sodium sulphate and 20 parts sodium chloride.

7. A process for the production of hard oil soluble resinous bodies as copal substitutes consisting in the step of subjecting a mixture containing rosin, sodium sulphate, sodium chloride and cobalt acetate to a heat treatment and preventing melting and fusion until the desired degree of hardness has been obtained.

In testimony whereof I affix my signature.

DR. EUGEN SCHAAL.